United States Patent
Huber

(10) Patent No.: US 9,505,646 B2
(45) Date of Patent: Nov. 29, 2016

(54) PANEL-COOLED SUBMERGED COMBUSTION MELTER GEOMETRY AND METHODS OF MAKING MOLTEN GLASS

(71) Applicant: JOHNS MANVILLE, Denver, CO (US)

(72) Inventor: Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 184 days.

(21) Appl. No.: 14/289,086

(22) Filed: May 28, 2014

(65) Prior Publication Data

US 2014/0260432 A1    Sep. 18, 2014

Related U.S. Application Data

(62) Division of application No. 12/817,754, filed on Jun. 17, 2010, now Pat. No. 8,769,992.

(51) Int. Cl.
| | | |
|---|---|---|
| C03B 5/235 | (2006.01) | |
| C03B 5/04 | (2006.01) | |
| C03B 5/44 | (2006.01) | |

(52) U.S. Cl.
CPC ............... *C03B 5/2356* (2013.01); *C03B 5/04* (2013.01); *C03B 5/235* (2013.01); *C03B 5/2353* (2013.01); *C03B 5/44* (2013.01); *C03B 2211/22* (2013.01); *C03B 2211/23* (2013.01); *C03B 2211/40* (2013.01); *C03B 2211/70* (2013.01); *Y02P 40/55* (2015.11); *Y02P 40/57* (2015.11)

(58) Field of Classification Search
CPC ....... C03B 5/04; C03B 5/235; C03B 5/2353; C03B 5/2356; C03B 5/44
See application file for complete search history.

(56) References Cited

U.S. PATENT DOCUMENTS

| | | |
|---|---|---|
| 2,718,096 A | 9/1955 | Henry et al. |
| 3,170,781 A | 2/1965 | Keefer |
| 3,224,855 A | 12/1965 | Plumat |
| 3,237,929 A | 3/1966 | Plumat et al. |
| 3,260,587 A | 7/1966 | Dolf et al. |
| 3,498,779 A | 3/1970 | Hathaway |
| 3,606,825 A | 9/1971 | Johnson |
| 3,627,504 A | 12/1971 | Johnson |
| 3,632,335 A | 1/1972 | Worner |
| 3,738,792 A | 6/1973 | Feng |
| 3,764,287 A | 10/1973 | Brocious |
| 3,885,945 A | 5/1975 | Rees et al. |
| 3,936,290 A | 2/1976 | Cerutti et al. |

(Continued)

FOREIGN PATENT DOCUMENTS

| | | |
|---|---|---|
| DE | 10 2005 033330 B3 | 8/2006 |
| EP | 2 133 315 A1 | 12/2009 |
| WO | 2009091558 A1 | 7/2009 |

*Primary Examiner* — Lisa Herring
(74) *Attorney, Agent, or Firm* — Robert D. Touslee

(57) ABSTRACT

A melter apparatus includes a floor, a ceiling, and a substantially vertical wall connecting the floor and ceiling at a perimeter of the floor and ceiling, a melting zone being defined by the floor, ceiling and wall, the melting zone having a feed inlet and a molten glass outlet positioned at opposing ends of the melting zone. The melting zone includes an expanding zone beginning at the inlet and extending to an intermediate location relative to the opposing ends, and a narrowing zone extending from the intermediate location to the outlet. One or more burners, at least some of which are positioned to direct combustion products into the melting zone under a level of molten glass in the zone, are also provided.

20 Claims, 4 Drawing Sheets

(56) References Cited

U.S. PATENT DOCUMENTS

| | | |
|---|---|---|
| 4,101,304 A | 7/1978 | Marchand |
| 4,110,098 A | 8/1978 | Mattmuller |
| 4,323,718 A | 4/1982 | Buhring |
| 4,539,034 A | 9/1985 | Hanneken |
| 5,199,866 A | 4/1993 | Joshi et al. |
| 5,299,929 A | 4/1994 | Yap |
| 5,360,171 A | 11/1994 | Yap |
| 5,449,286 A | 9/1995 | Snyder et al. |
| 5,483,548 A | 1/1996 | Coble |
| 5,490,775 A | 2/1996 | Joshi et al. |
| 5,545,031 A | 8/1996 | Joshi et al. |
| 5,575,637 A | 11/1996 | Slavejkov et al. |
| 5,979,191 A | 11/1999 | Jian |
| 5,993,203 A | 11/1999 | Koppang |
| 6,244,197 B1 | 6/2001 | Coble |
| 6,460,376 B1 | 10/2002 | Jeanvoine et al. |
| 6,739,152 B2 | 5/2004 | Jeanvoine et al. |
| 6,857,999 B2 | 2/2005 | Jeanvoine |
| 6,883,349 B1 | 4/2005 | Jeanvoine |
| 7,273,583 B2 | 9/2007 | Rue et al. |
| 7,428,827 B2 | 9/2008 | Maugendre et al. |
| 7,448,231 B2 | 11/2008 | Jeanvoine et al. |
| 7,565,819 B2 | 7/2009 | Jeanvoine et al. |
| 2002/0162358 A1 | 11/2002 | Jeanvoine et al. |
| 2004/0099009 A1 | 5/2004 | Linz et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2006/0000239 A1 | 1/2006 | Jeanvoine et al. |
| 2007/0122332 A1 | 5/2007 | Jacques et al. |
| 2007/0212546 A1 | 9/2007 | Jeanvoine et al. |
| 2007/0266737 A1 | 11/2007 | Rodek et al. |
| 2008/0256981 A1 | 10/2008 | Jacques et al. |
| 2008/0276652 A1 | 11/2008 | Bauer et al. |
| 2008/0302136 A1 | 12/2008 | Bauer et al. |
| 2009/0042709 A1 | 2/2009 | Jeanvoine et al. |
| 2010/0064732 A1 | 3/2010 | Jeanvoine et al. |
| 2011/0236846 A1 | 9/2011 | Rue et al. |
| 2012/0077135 A1 | 3/2012 | Charbonneau |

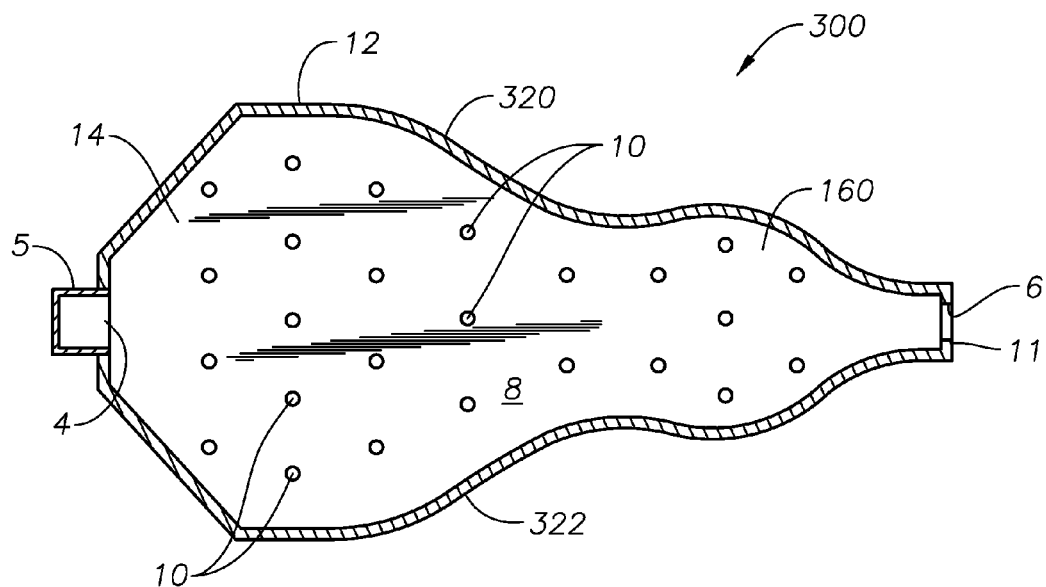
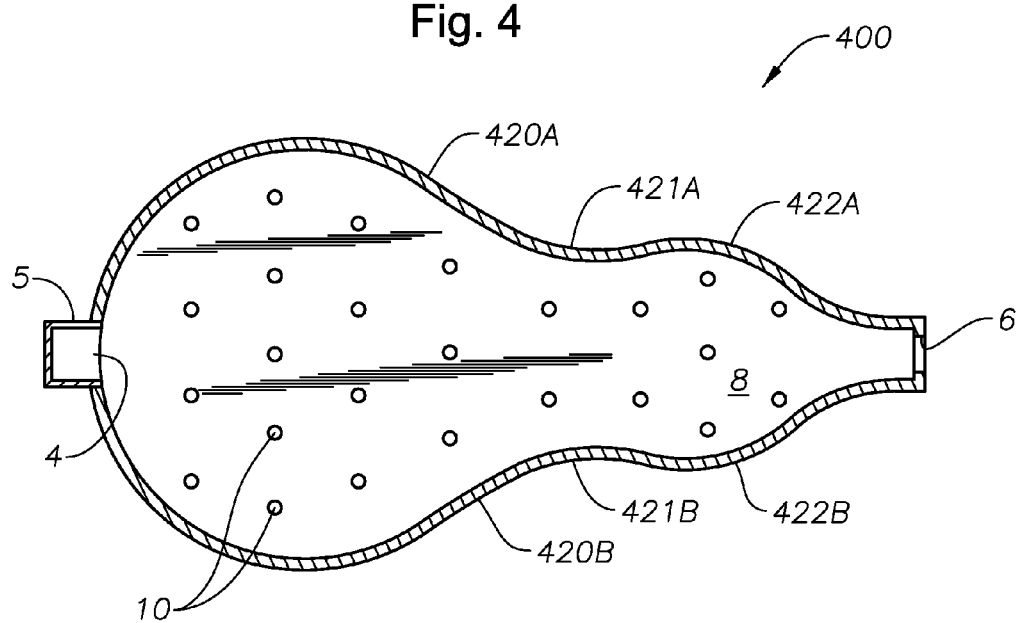

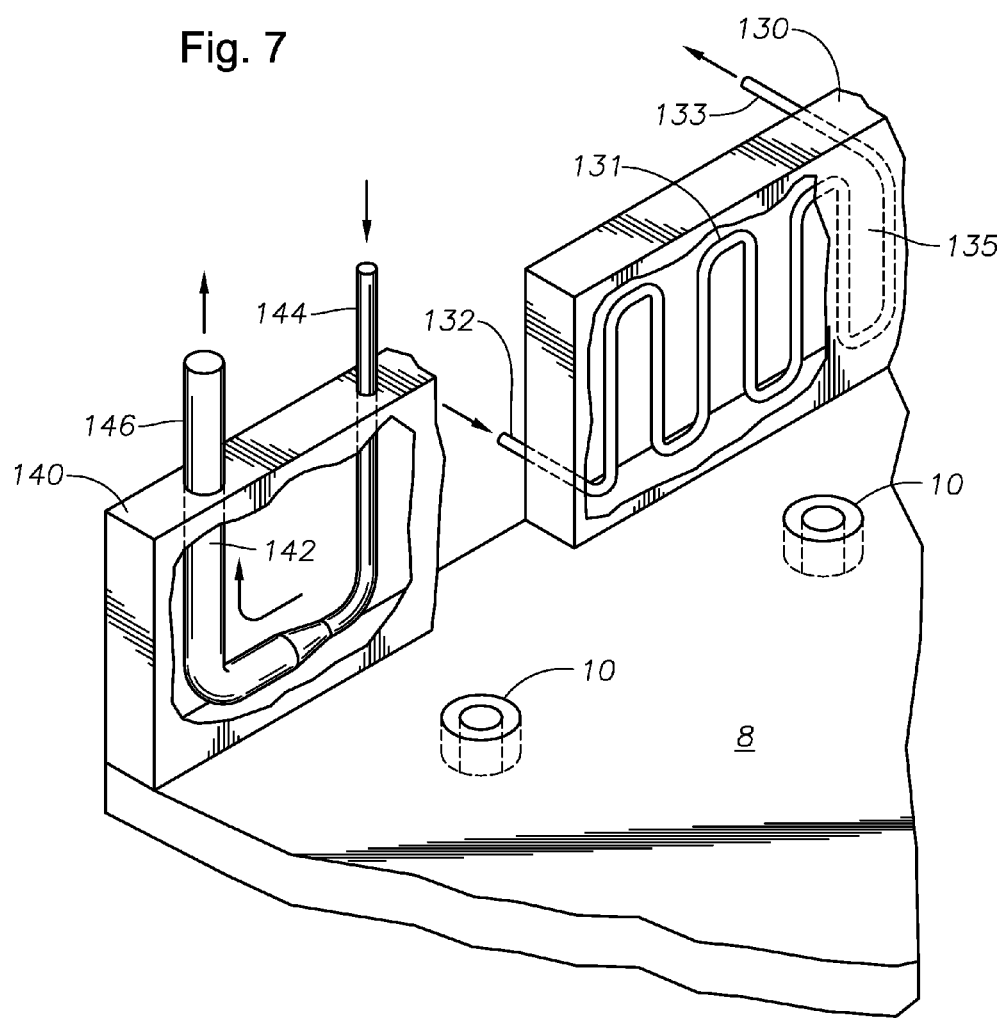

PANEL-COOLED SUBMERGED COMBUSTION MELTER GEOMETRY AND METHODS OF MAKING MOLTEN GLASS

CROSS-REFERENCE TO RELATED APPLICATION

This application is a division of U.S. patent application Ser. No. 12/817,754, filed Jun. 17, 2010, now U.S. Pat. No. 8,769,992, issued Jul. 8, 2014.

BACKGROUND OF THE INVENTION

Field of Invention

The present invention relates generally to the field of combustion furnaces and methods of use, and more specifically to improved submerged combustion melters and methods of use in producing molten glass.

Related Art

Glass melting furnaces have traditionally been of rectangular shape due to the issue of construction with refractory blocks and ability to control the flow of the molten glass through the melter. (Some all-electric designs are circular, such as Pochet and SORG VSM designs.) However, there are significant dead (low flow or stagnant) regions that result from the rectangular construction.

Submerged combustion has been proposed in several patents for application in commercial glass melting, including U.S. Pat. Nos. 4,539,034; 3,170,781; 3,237,929; 3,260,587; 3,606,825; 3,627,504; 3,738,792; 3,764,287; 6,460,376; 6,739,152; 6,857,999; 6,883,349; 7,273,583; 7,428,827; 7,448,231; and 7,565,819; and published U.S. Patent Application Nos. 2004/0168474; 2004/0224833; 2007/0212546; 2006/0000239; 2002/0162358; 2009/0042709; 2008/0256981; 2007/0122332; 2004/0168474; 2004/0224833; and 2007/0212546. In submerged combustion glass melting, the combustion gases are injected beneath the surface of the molten glass and rise upward through the melt. The glass is heated at a higher efficiency via the intimate contact with the combustion gases. However, using submerged combustion burners does not alleviate dead flow regions that result from the rectangular construction of the melter itself.

Energy costs continue to increase, spurring efforts to find ways to reduce the amount of fuel in glass manufacturing. Oxy-fuel burners have been used in the glass industry in general, especially in the fiberglass, TV glass, and container glass industry segments. There are few complete oxy-fuel fired float furnaces in operation today and they have been using retrofit oxy-fuel burners designed specifically for smaller container or fiberglass furnaces. These conversions were most likely made to meet emissions standards. Known oxy-fuel burners are predominately nozzle mix designs and avoid premixing for safety reasons due to the increased reactivity of using oxygen as the oxidant versus air. Some common designs of nozzle mix oxy-fuel burners are described in U.S. Pat. Nos. 5,199,866; 5,490,775; and 5,449,286. The concept of nozzle mix oxy-fuel burners is to mix fuel and oxygen at the burner nozzle. The flame produced is a diffusion flame with the flame characteristics determined by mixing rates. Short intense flames are most common with these burners, however some delayed mixing geometry are considered to generate longer luminous flames. More recently, "flat flame" burners have been used in the industry for melting applications, in which the flame is above the melt and generally parallel thereto. These burners produce a flame that is 2 to 3 times wider than a traditional (cylindrical) oxy-fuel flame. U.S. Pat. Nos. 5,545,031; 5,360,171; 5,299,929; and 5,575,637 show examples of flat flame burners. The above-mentioned U.S. Pat. No. 7,273,583 describes a submerged combustion burner having co-axial fuel and oxidant tubes forming an annular space therebetween, wherein the outer tube extends beyond the end of the inner tube. A burner nozzle having an outside diameter corresponding to the inside diameter of the outer tube is connected to the outlet end of the inner tube and forms a centralized opening in fluid communication with the inner tube and at least one peripheral longitudinally oriented opening in fluid communication with the annular space. A longitudinally adjustable rod may be disposed within the inner tube for adjustment of fluid flow therethrough, and a cylindrical insert having a flame stabilizer for stabilizing a flame produced by the burner is attached to the outlet end of the outer tube. All of the patent documents referenced in this document are incorporated herein by reference.

It would be an advance in the glass melting art to develop non-rectangular melting furnaces ("melters") that have reduced dead flow (stagnant) regions, while taking advantage of the efficiency of submerged combustion burners, to increase melter throughput and produce high quality molten glass.

SUMMARY

In accordance with the present disclosure, melters and processes of using them are described that reduce dead flow (stagnant) regions and take advantage submerged combustion burners. The melters of the present disclosure are at least partially constructed using cooled refractory panels, which allows construction of melters having configurations that reduce or avoid the dead flow corner regions prevalent in traditional glass melter rectangular designs by eliminating the dead (low or stagnant) corners of the known rectangular melter configurations. In certain melter embodiments according to this disclosure, the side walls are angled so that the flow spacing for molten glass narrows toward the discharge (molten glass outlet), in certain embodiments to the extreme of a V-shape. In melters taught and described in this disclosure, the molten glass flow can be completely melted and glass of high quality produced with minimal energy waste. These melter designs are relevant to the full range of materials that could be melted with submerged combustion technology. With submerged combustion technology the use of a cooled panel design is feasible due to the greatly reduced size of the melter for a given throughput. The use of cooled panels (cooled using fluid—liquid, gas, or combination thereof) to construct a glass melter allows more flexibility in the shape of the melter, especially in combination with submerged combustion burners.

"Submerged" as used herein means that combustion gases emanate from burners under the level of the molten glass; the burners may be floor-mounted, wall-mounted, or in melter embodiments comprising more than one submerged combustion burner, any combination thereof (for example, two floor mounted burners and one wall mounted burner). As used herein the term "combustion gases" means substantially gaseous mixtures of combusted fuel, any excess oxidant, and combustion products, such as oxides of carbon (such as carbon monoxide, carbon dioxide), oxides of nitrogen, oxides of sulfur, and water. Combustion products may include liquids and solids, for example soot and unburned liquid fuels. "Oxidant" as used herein includes air and gases having the same molar concentration of oxygen as air, oxygen-enriched air (air having oxygen concentration of oxygen greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen. Oxidants may be supplied from a pipeline, cylinders, storage facility, cryogenic air separation unit, membrane permeation separator, or adsorption unit.

A first aspect of the invention is a melter apparatus comprising:
a) a floor and a ceiling;
b) a substantially vertical wall connecting the floor and ceiling at a perimeter of the floor and ceiling, a melting zone being defined by the floor, ceiling and wall, the melting zone having a feed inlet and a molten glass outlet positioned at opposing ends of the melting zone, the melting zone comprising an expanding zone beginning at the inlet and extending to an intermediate location relative to the opposing ends, and a narrowing zone extending from the intermediate location to the outlet; and
c) a plurality of burners, at least some of which are positioned to direct combustion products into the melting zone under a level of molten glass in the zone.

In certain embodiments the intermediate location is positioned where the melting zone has a maximum width $W_M$. In certain embodiments at least some of the wall comprises fluid-cooled refractory panels. In certain embodiments, the fluid-cooled panels are liquid-cooled panels comprising one or more passages for flow of a liquid into and out of the passages.

In certain embodiments the melting zone has a plan view shape defined by first and second trapezoids sharing a common base positioned at the intermediate location and substantially perpendicular to a longitudinal axis of the melter, the first trapezoid having a side parallel to the base and positioned at the inlet, the second trapezoid having a side parallel to the base and positioned at the outlet.

In certain embodiments at least some of the burners are floor-mounted and positioned in one or more parallel rows substantially perpendicular to a longitudinal axis of the melter. In certain embodiments, the number of burners in each row is proportional to width of the melter. In certain embodiments the depth of the melter decreases as width of the melter in the narrowing zone decreases. In certain other embodiments, the intermediate location comprises a constant width zone positioned between the expanding zone and the narrowing zone.

In certain embodiments, at least some of the burners are oxy-fuel burners. In certain embodiments the oxy-fuel burners may comprise one or more submerged combustion burners each having co-axial fuel and oxidant tubes forming an annular space therebetween, wherein the outer tube extends beyond the end of the inner tube, as taught in U.S. Pat. No. 7,273,583.

In certain embodiments, the melter apparatus has a throughput of 2 ft$^2$ per short ton per day (2 ft2/stpd) or less, and in some embodiments 0.5 ft$^2$/stpd or less.

In certain exemplary embodiments, wherein the melter wall comprises fluid-cooled panels, the wall comprises a refractory liner at least between the panels and the molten glass.

In certain embodiments the wall in the expanding zone and the narrowing zone is non-linear.

In certain embodiments, the refractory cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Another aspect of this disclosure is a process comprising:
a) feeding at least one partially vitrifiable material into a feed inlet of a melting zone of a refractory melter apparatus comprising a floor, a ceiling, and a substantially vertical wall connecting the floor and ceiling at a perimeter of the floor and ceiling, the melting zone comprising an expanding zone beginning at the inlet and extending to an intermediate location relative to opposing ends of the melter, and a narrowing zone extending from the intermediate location to a molten glass outlet;
b) heating the at least one partially vitrifiable material with at least one burner directing combustion products into the melting zone under a level of the molten glass in the zone; and
c) discharging molten glass from a molten glass outlet positioned at an end of the melting zone opposite the inlet.

In certain embodiments, the process comprises discharging at least 0.5 short tons per day per square foot of melter floor, and in certain exemplary processes, at least 2 short tons per day per square foot of melter floor.

Certain exemplary processes comprise cooling the wall by the wall comprising cooled refractory panels and directing a heat transfer fluid through the panels.

Certain apparatus embodiments may include a plurality of tubes functioning to route oxygen or oxygen-enriched air through a refractory burner block, the tubes fluidly connected to one or more oxygen supply manifolds. Both the tubes and the manifolds may be comprised of metal, ceramic, ceramic-lined metal, or combination thereof.

In all apparatus embodiments the sources of oxidant and fuel may be one or more conduits, pipelines, storage facility, cylinders, or, in the case of oxidant, ambient air. Secondary and tertiary oxidants, if used may be supplied from a pipeline, cylinder, storage facility, cryogenic air separation unit, membrane permeation separator, or adsorption unit such as a vacuum swing adsorption unit.

Certain embodiments may comprise using oxygen-enriched air as the primary oxidant, the fuel is a gaseous fuel, the gaseous fuel being selected from methane, natural gas, liquefied natural gas, propane, carbon monoxide, hydrogen, steam-reformed natural gas, atomized oil or mixtures thereof, and the oxygen-enriched air comprising at least 90 mole percent oxygen. In certain embodiments the oxygen may be injected into an intermediate mixture upstream of a combustion chamber of a burner, while in other embodiments the oxygen may be injected into the combustion chamber. The oxygen injection volumetric flow rate may range from about 1000 scfh (standard cubic feet per hour) to about 8000 scfh (about 28 cubic meters/hour ($m^3$/h) to about 225 $m^3$/h), or from about 2000 scfh to about 6000 scfh (about 56 $m^3$/h to about 168 $m^3$/h), with natural gas flow rates ranging from about 1000 scfh to about 4000 scfh (about 28 to about 112 $m^3$/h), or from about 1000 to about 3000 scfh (about 28 to about 84 $m^3$/h) and may be injected through a non-cooled manifold, a gas-cooled manifold, or a liquid-cooled manifold. The gas-cooled manifold may utilize air as a coolant gas, while the liquid-cooled manifold may use water as a coolant. Methods of the invention include those wherein the combustion chamber pressure does not exceed 10 psig.

Melter apparatus and process embodiments of the invention may be controlled by one or more controllers. For example, burner combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary apparatus and methods of the invention comprise a combustion controller which receives one or more input parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Melter apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which:

FIGS. 1-5, inclusive, are plan views, with parts broken away, of five melter embodiments in accordance with the present disclosure;

FIG. 7 is a perspective view of one cooled panel useful in melters of the present disclosure.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of various melter apparatus and process embodiments in accordance with the present disclosure. However, it will be understood by those skilled in the art that the melter apparatus and processes of using same may be practiced without these details and that numerous variations or modifications from the described embodiments may be possible which are nevertheless considered within the appended claims.

Figure 5:
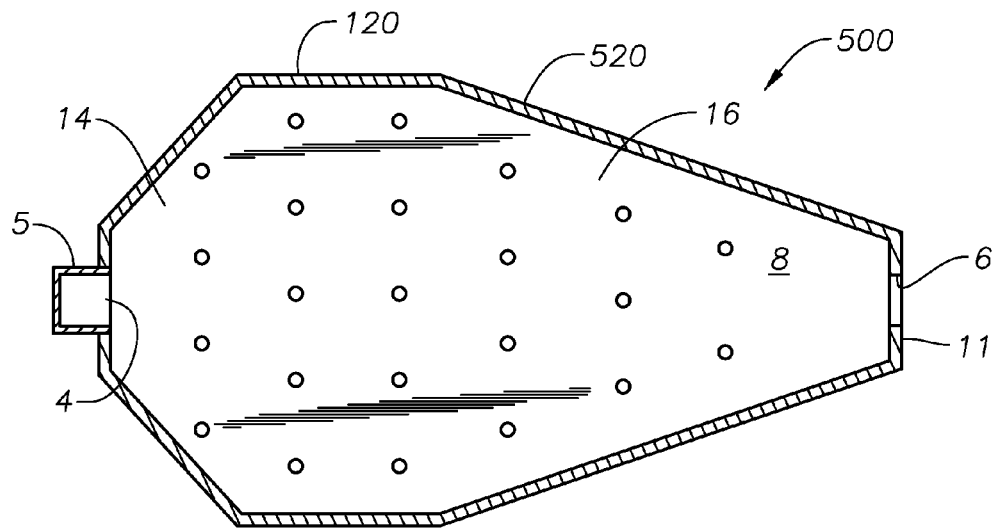
Figure 6:
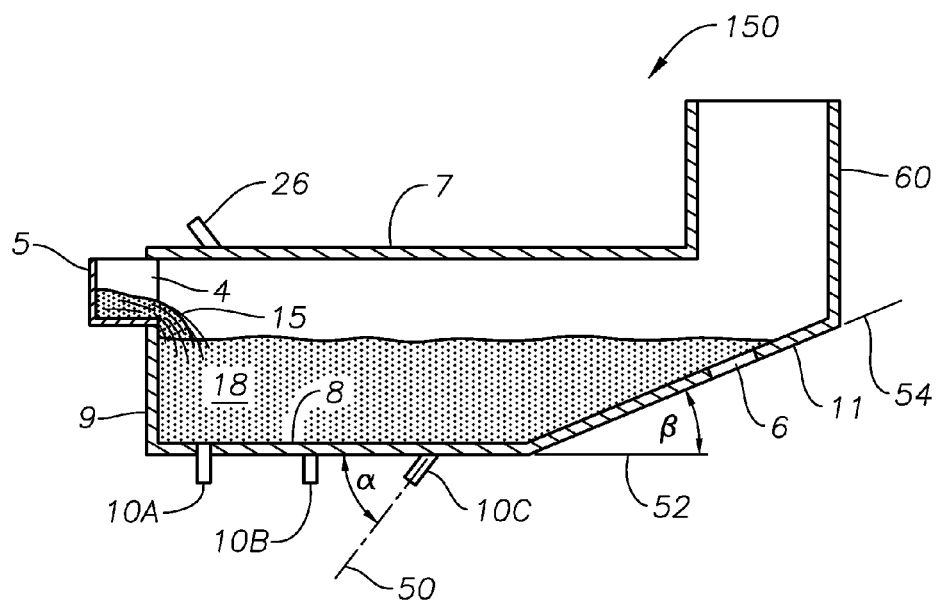
FIG. 6 is a side sectional view of the melter of FIG. 1.

Referring now to the figures, FIGS. 1-5 are plan views, with parts broken away, of five melter embodiments in accordance with the present disclosure. FIG. 6 is a side cross-sectional view of the melter apparatus illustrated in FIG. 1. The same numerals are used for the same or similar features in the various figures. In the plan views illustrated in FIGS. 1-5, it will be understood in each case that the roof and exhaust chimney are not illustrated in order to illustrate more clearly the key features of each embodiment. Embodiment 100 of FIG. 1 comprises a peripheral wall 2 of melter 100, wall 2 having an inlet 4, a batch feed chute 5, and a melter discharge 6 through which molten glass exits the melter. Melter 100 also comprises a roof 7 (FIG. 6), a floor 8, a feed end 9, and a discharge end 11.

Figure 1:
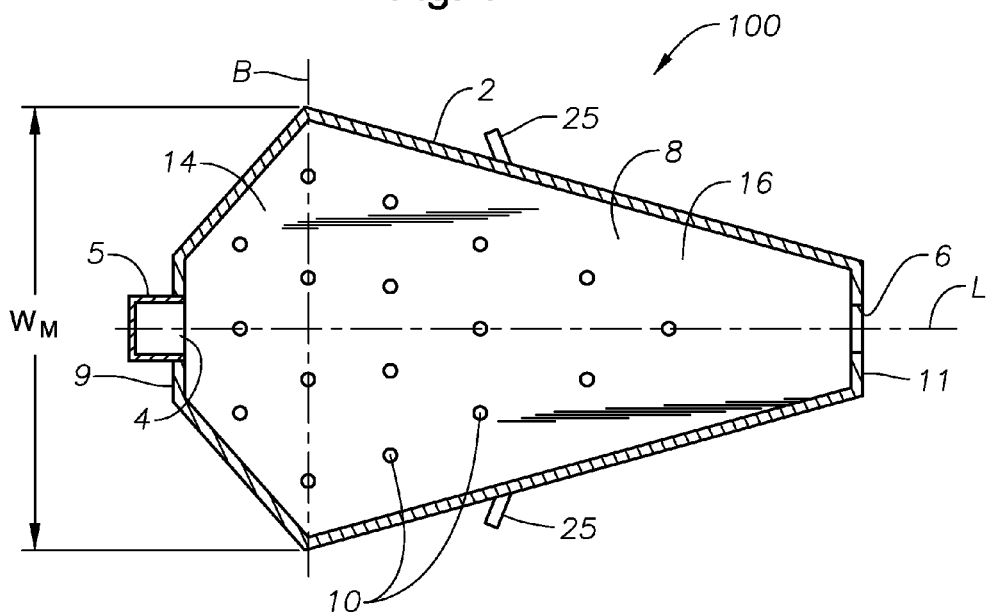
Figure 2:
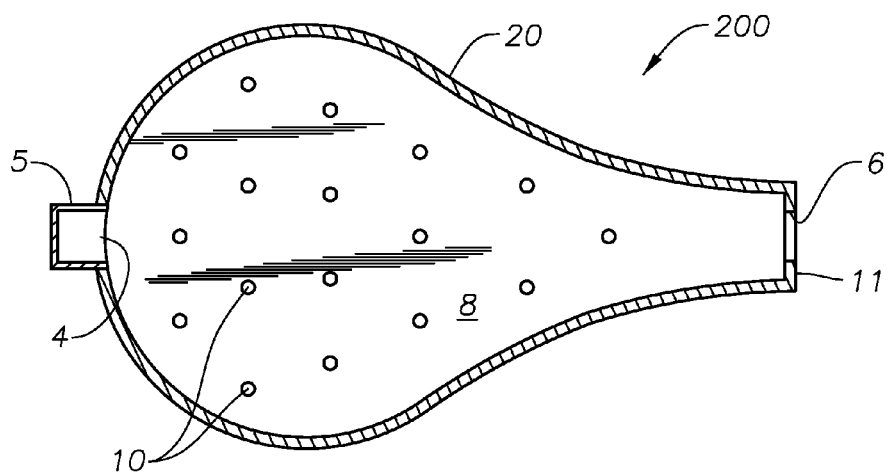

An important feature of all melter apparatus described herein, and exemplified in melter 100 of FIG. 1, is that wall 2 forms an expanding melting zone 14 formed by a first trapezoidal region, and a narrowing melting zone 16 formed by a second trapezoidal region of wall 2. The first trapezoid forming expanding melting zone 14 and the second trapezoid forming narrowing melting zone 16 share a common base in this embodiment, indicated at B, at an intermediate location between the melter inlet 4 and discharge 6. Common base B defines the location of the maximum width, $W_M$, of melter 100. The primary importance of these melting zones is that no 90 degree corners are present in the melter where there may be stagnation of molten glass flow.

Another important feature of melter apparatus 100 is the provision of submerged combustion burners 10. In embodiment 100, burners 10 are floor-mounted burners, illustrated in rows substantially perpendicular to the longitudinal axis, L, of melter 100. In certain embodiments, burners 10 are positioned to emit combustion products into molten glass in the melting zones 14, 16 in a fashion so that the gases penetrate the melt generally perpendicularly to the floor. In other embodiments, one or more burners 10 may emit combustion products into the melt at an angle (see FIG. 6, angle α) to the floor; angle α may be more or less than 45 degrees, but in certain embodiments may be 30 degrees, or 40 degrees, or 50 degrees, or 60 degrees, or 70 degrees, or 80 degrees.

Melter apparatus in accordance with the present disclosure may also comprise one or more wall-mounted submerged combustion burners, as indicated at 25 in FIG. 1, and/or one or more roof-mounted burners 26, as indicated at 26 in FIG. 6. Roof-mounted burners may be useful to pre-heat the melter apparatus melting zones 14, 16, and serve as ignition sources for one or more submerged combustion burners 10. Melter apparatus having only wall-mounted, submerged-combustion burners are also considered within the present disclosure. Roof-mounted burners 26 may be oxy-fuel burners, but as they are only used in certain situations, are more likely to be air/fuel burners. Most often they would be shut-off after pre-heating the melter and/or after starting one or more submerged combustion burners 10. In certain embodiments, all submerged combustion burners 10 are oxy/fuel burners (where "oxy" means oxygen, or oxygen-enriched air, as described earlier), but this is not necessarily so in all embodiments; some or all of the submerged combustion burners may be air/fuel burners. Furthermore, heating may be supplemented by electrical heating in certain embodiments, in certain melter zones.

FIGS. 2-5 illustrate further embodiments and features of melter apparatus of this disclosure. Embodiment 200 of FIG.

2 illustrates that wall 20 may have a free-flowing form, devoid of angles. Embodiment 300 of FIG. 3 illustrates that wall 320 may be configured so that intermediate location 12 may comprise an intermediate region of melter 300 having constant width, extending from a first trapezoidal region 14 to the beginning of the narrowing melting region 160. Narrowing melting region 160 in embodiment 300 has alternating narrowing and expanding regions, formed by wall sections 321, 322, although it has a narrowing effect overall leading to discharge 6. Embodiment 400 of FIG. 4 comprises a narrowing melting zone comprising a first narrowing section formed by wall sections 420A and 420B which lead to a narrow channel formed by wall sections 421A and 421B, and then a short expanding zone formed by wall sections 422A and 422B, and finally narrowing down again to discharge 6. Embodiment 400 may provide a final melt mixing or retention zone between wall sections 422A and 422B, which may advantageous in certain embodiments, for example when colorants are added to the melt. Embodiment 500 of FIG. 5 illustrates an embodiment similar to embodiment 100 of FIG. 1, except that wall 520 forms an intermediate melting zone 120 of constant width.

FIG. 6 is a side sectional view of the melter of FIG. 1, and illustrates a charge of batch material 15 being fed into melter inlet 4 through feeder 5. Three floor-mounted submerged combustion burners are indicated, 10A, 10B, and 10C. FIG. 6 also illustrates angles α and β, where angle α is defined as an angle between floor-mounted burner 10C central axis 50 and horizontal 52, and angle β is defined as the angle between horizontal and a line 54 through the floor of the decreasing depth region of the melter. Values for angle α were mentioned earlier. Angle β may range from about 0 degrees to about 90 degrees, or from about 0 degrees to about 60 degrees.

As angle β is decreased, allowable values for angle α may increase, all other factors being equal. When angle β is large, say for example 45 degrees or larger, if angle α is too small, for example 45 degrees or less, unacceptable refractory wear may occur near or on the inclined region of floor 8, potentially accompanied by lesser quality glass melt, as the refractory material becomes part of the melt. It should also be noted that certain melter embodiments may include one or more oxy-fuel and/or air-fuel burners mounted in the inclined floor region, or wall 2 of the inclined floor region.

FIG. 7 is a perspective view of a portion of a melter, illustrating two embodiments of cooled panels useful in melter apparatus of the present disclosure. Also illustrated in FIG. 7 is a portion of melter floor 8, and three floor-mounted burners 10. A first cooled-panel 130 is liquid-cooled, having one or more conduits or tubing 131 therein, supplied with liquid through conduit 132, with another conduit 133 discharging warmed liquid, routing heat transferred from inside the melter to the liquid away from the melter. Liquid-cooled panel 130 as illustrated also includes a thin refractory liner 135, which minimizes heat losses from the melter, but allows formation of a thin frozen glass shell to form on the surfaces and prevent any refractory wear and associated glass contamination. Another cooled panel 140 is illustrated, in this case an air-cooled panel, comprising a conduit 142 that has a first, small diameter section 144, and a large diameter section 146. Warmed air transverses conduit 142 in the direction of the curved arrow. Conduit section 146 is larger in diameter to accommodate expansion of the air as it warms. Air-cooled panels such as illustrated in FIG. 7 are described more fully in U.S. Pat. No. 6,244,197, which is incorporated herein by reference.

In operation of melter apparatus of this disclosure illustrated schematically in FIG. 1, feed material, such as E-glass batch (melts at about 1400° C.), insulation glass batch (melts at about 1200° C.), or scrap in the form of glass fiber mat and/or insulation having high organic binder content, glass cullet, and the like, is fed to the melter through a chute 5 and melter inlet 4. One or more submerged combustion burners 10 are fired to melt the feed materials and to maintain a molten glass melt in regions 14 and 16. Molten glass moves toward discharge outlet 6, and is discharged from the melter. Combustion product gases (flue gases) exit through exit duct 60, or may be routed to heat recovery apparatus, as discussed herein. If oxy/fuel combustion is employed in some or all burners, the general principle is to operate combustion in the burners in a manner that replaces some of the air with a separate source of oxygen. The overall combustion ratio may not change. Importantly, the throughput of melter apparatus described in the present disclosure may be 2 $ft^2$ per short ton per day (2 $ft^2$/stpd) or less, and in some embodiments 0.5 $ft^2$/stpd or less. This is at least twice, in certain embodiments ten times the throughput of conventional melter apparatus.

Melter apparatus described in accordance with the present disclosure may be constructed using only refractory cooled panels, and a thin refractory lining, as discussed herein. The thin refractory coating may be 1 centimeter, 2 centimeters, 3 centimeters or more in thickness, however, greater thickness may entail more expense without resultant greater benefit. The refractory lining may be one or multiple layers. Alternatively, melters described herein may be constructed using cast concretes such as disclosed in U.S. Pat. No. 4,323,718. The thin refractory linings discussed herein may comprise materials described in the 718 patent, which is incorporated herein by reference. Two cast concrete layers are described in the 718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the refractory cooled panels, melter refractory liners, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the melter geometry and type of glass to be produced.

Burners useful in the melter apparatus described herein include those described in U.S. Pat. Nos. 4,539,034; 3,170,781; 3,237,929; 3,260,587; 3,606,825; 3,627,504; 3,738,792; 3,764,287; and 7,273,583, all of which are incorporated herein by reference in their entirety. One useful burner, for example, is described in the 583 patent as comprising a method and apparatus providing heat energy to a bath of molten material and simultaneously creating a well-mixed molten material. The burner functions by firing a burning gaseous or liquid fuel-oxidant mixture into a volume of molten material. The burners described in the 583 patent provide a stable flame at the point of injection of the fuel-oxidant mixture into the melt to prevent the formation of frozen melt downstream as well as to prevent any resultant explosive combustion; constant, reliable, and rapid ignition of the fuel-oxidant mixture such that the mixture burns quickly inside the molten material and releases the heat of combustion into the melt; and completion of the combustion process in bubbles rising to the surface of the melt. In one embodiment, the burners described in the 583 patent comprises an inner fluid supply tube having a first fluid inlet end and a first fluid outlet end and an outer fluid supply tube having a second fluid inlet end and a second fluid outlet end coaxially disposed around the inner fluid supply tube and forming an annular space between the inner fluid supply tube and the outer fluid supply tube. A burner nozzle is connected to the first fluid outlet end of the inner fluid supply tube. The outer fluid supply tube is arranged such that the second fluid outlet end extends beyond the first fluid outlet end, creating, in effect, a combustion space or chamber bounded by the outlet to the burner nozzle and the extended portion of the outer fluid supply tube. The burner nozzle is sized with an outside diameter corresponding to the inside diameter of the outer fluid supply tube and forms a centralized opening in fluid communication with the inner fluid supply tube and at least one peripheral longitudinally oriented opening in fluid communication with the annular space between the inner and outer fluid supply tubes. In certain embodiments, a longitudinally adjustable rod is disposed within the inner fluid supply tube having one end proximate the first fluid outlet end. As the adjustable rod is moved within the inner fluid supply tube, the flow characteristics of fluid through the inner fluid supply tube are modified. A cylindrical flame stabilizer element is attached to the second fluid outlet end. The stable flame is achieved by supplying oxidant to the combustion chamber through one or more of the openings located on the periphery of the burner nozzle, supplying fuel through the centralized opening of the burner nozzle, and controlling the development of a self-controlled flow disturbance zone by freezing melt on the top of the cylindrical flame stabilizer element. The location of the injection point for the fuel-oxidant mixture below the surface of the melting material enhances mixing of the components being melted and increases homogeneity of the melt. Thermal $NO_x$ emissions are greatly reduced due to the lower flame temperatures resulting from the melt-quenched flame and further due to insulation of the high temperature flame from the atmosphere.

The term "fuel", according to this invention, means a combustible composition comprising a major portion of, for example, methane, natural gas, liquefied natural gas, propane, atomized oil or the like (either in gaseous or liquid form). Fuels useful in the invention may comprise minor amounts of non-fuels therein, including oxidants, for purposes such as premixing the fuel with the oxidant, or atomizing liquid fuels.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio is between 0.9 and 1.2. In certain embodiments, the equivalent fuel content of the feed material must be taken into account. For example, organic binders in glass fiber mat scrap materials will increase the oxidant requirement above that required strictly for fuel being combusted. In consideration of these embodiments, the combustion ratio may be increased above 1.2, for example to 1.5, or to 2, or 2.5, or even higher, depending on the organic content of the feed materials.

The velocity of the fuel gas in the various burners depends on the burner geometry used, but generally is at least about 15 m/s. The upper limit of fuel velocity depends primarily on the desired mixing of the melt in the melter apparatus, melter geometry, and the geometry of the burner; if the fuel velocity is too low, the flame temperature may be too low, providing inadequate melting, which is not desired, and if the fuel flow is too high, flame might impinge on the melter floor, roof or wall, and/or heat will be wasted, which is also not desired.

In certain embodiments of the invention it may be desired to implement heat recovery. In embodiments of the invention employing a heat transfer fluid for heat recovery, it is possible for a hot intermediate heat transfer fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated. Furthermore, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Apparatus and methods in accordance with the present disclosure include those wherein the primary means for transferring heat are double shell radiation recuperators. Preheater means useful in apparatus and methods described herein may comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Although only a few exemplary embodiments of this invention have been described in detail above, those skilled in the art will readily appreciate that many modifications are possible in the exemplary embodiments without materially departing from the novel apparatus and processes described herein. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A process comprising:
   a) feeding at least one partially vitrifiable material into a feed inlet of a melting zone of a melter apparatus comprising a floor, a ceiling, and a substantially vertical wall connecting the floor and ceiling at a perimeter of the floor and ceiling, the melting zone comprising an expanding zone beginning at the feed inlet and extending to an intermediate location relative to opposing ends of the melter, and a narrowing zone extending from the intermediate location to a molten glass outlet, the melting zone having a plan view shape defined by first and second trapezoids sharing a common base positioned at the intermediate location and substantially perpendicular to a longitudinal axis of the melter, the first trapezoid having a side parallel to the base and positioned at the feed inlet, the second trapezoid having a side parallel to the base and positioned at the molten glass outlet;

b) heating the at least one partially vitrifiable material with at least one burner directing combustion products into the melting zone under a level of molten glass in the melting zone; and c) discharging the molten glass from a molten glass outlet positioned at an end of the melting zone opposite the feed inlet.

2. The process of claim 1 comprising discharging at least 0.5 short tons per day per square foot of melter floor.

3. The process of claim 1 comprising discharging at least 2 short tons per day per square foot of melter floor.

4. The process of claim 1 comprising cooling the substantially vertical wall by the substantially vertical wall comprising cooled refractory panels and directing a heat transfer fluid through the panels.

5. The process of claim 4 comprising decreasing depth of the molten glass as it moves from the intermediate location to the molten glass outlet.

6. The process of claim 1 wherein the heating comprises directing combustion products into the melting zone under a level of the molten glass in the melting zone employing two or more floor-mounted burners.

7. The process of claim 6 comprising directing combustion products into the melting zone under a level of the molten glass in the melting zone employing two or more rows of floor-mounted burners arranged substantially perpendicular to the longitudinal axis of the melter.

8. A process comprising:
a) feeding at least one partially vitrifiable material into a feed inlet of a melting zone of a melter apparatus comprising a floor, a ceiling, and a substantially vertical wall connecting the floor and ceiling at a perimeter of the floor and ceiling, the melting zone being non-symmetrical in plan about an axis substantially perpendicular to a longitudinal axis of the melter, the melting zone comprising an expanding zone beginning at the feed inlet and extending to an intermediate location relative to opposing ends of the melter, and a narrowing zone extending from the intermediate location to a molten glass outlet, wherein the melting zone has a plan view shape defined by first and second trapezoids sharing a common base positioned at the intermediate location and substantially perpendicular to a longitudinal axis of the melter, the first trapezoid having a side parallel to the base and positioned at the feed inlet, the second trapezoid having a side parallel to the base and positioned at the molten glass outlet;
b) heating the at least one partially vitrifiable material with at least one burner directing combustion products into the melting zone under a level of molten glass in the melting zone;

c) cooling the substantially vertical wall by the substantially vertical wall comprising cooled refractory panels and directing a heat transfer fluid through the panels; and
d) discharging the molten glass from the molten glass outlet positioned at an end of the melting zone opposite the feed inlet.

9. The process of claim 8 comprising discharging at least 0.5 short tons per day per square foot of melter floor.

10. The process of claim 8 comprising discharging at least 2 short tons per day per square foot of melter floor.

11. The process of claim 8 wherein the heating comprises directing combustion products into the melting zone under a level of the molten glass in the melting zone employing two or more floor-mounted burners.

12. The process of claim 11 comprising directing combustion products into the melting zone under a level of the molten glass in the melting zone employing two or more rows of floor-mounted burners arranged substantially perpendicular to the longitudinal axis of the melter.

13. The process of claim 8 comprising decreasing depth of the molten glass as it moves from the intermediate location to the molten glass outlet.

14. A process comprising:
a) feeding at least one partially vitrifiable material into a feed inlet of a melting zone of a melter apparatus comprising a floor, a ceiling, and a substantially vertical wall connecting the floor and ceiling at a perimeter of the floor and ceiling, the melting zone being non-symmetrical in plan about an axis substantially perpendicular to a longitudinal axis of the melter, the melting zone comprising an expanding zone beginning at the feed inlet and extending to an intermediate location relative to opposing ends of the melter, and a narrowing zone extending from the intermediate location to a molten glass outlet, the substantially vertical wall in the expanding zone and the narrowing zone being non-linear;
b) heating the at least one partially vitrifiable material with at least one burner directing combustion products into the melting zone under a level of molten glass in the melting zone; and
c) discharging the molten glass from the molten glass outlet positioned at an end of the melting zone opposite the feed inlet.

15. The process of claim 14 comprising discharging at least 0.5 short tons per day per square foot of melter floor.

16. The process of claim 14 comprising discharging at least 2 short tons per day per square foot of melter floor.

17. The process of claim 14 comprising cooling the substantially vertical wall by the substantially vertical wall comprising cooled refractory panels and directing a heat transfer fluid through the panels.

18. The process of claim 14 wherein the heating comprises directing combustion products into the melting zone under a level of the molten glass in the melting zone employing two or more floor-mounted burners.

19. The process of claim 18 comprising directing combustion products into the melting zone under a level of the molten glass in the melting zone employing two or more rows of floor-mounted burners arranged substantially perpendicular to the longitudinal axis of the melter.

20. The process of claim 17 comprising decreasing depth of the molten glass as it moves from the intermediate location to the molten glass outlet.

* * * * *